(12) United States Patent
Tsai (10) Patent No.: US 9,403,229 B2
(45) Date of Patent: Aug. 2, 2016

(54) SIMPLE TYPE ELECTRIC HEATING TOOL AND HEATING DEVICE THEREOF

(71) Applicant: Jung-Fa Tsai, Taichung (TW)

(72) Inventor: Jung-Fa Tsai, Taichung (TW)

( * ) Notice: Subject to any disclaimer, the term of this patent is extended or adjusted under 35 U.S.C. 154(b) by 132 days.

(21) Appl. No.: 14/320,700

(22) Filed: Jul. 1, 2014

(65) Prior Publication Data

US 2015/0196966 A1    Jul. 16, 2015

(30) Foreign Application Priority Data

Jan. 14, 2014    (TW) .............................. 103101257 A (51) Int. Cl.
*B23K 3/03*    (2006.01)
*B25G 3/22*    (2006.01)

(52) U.S. Cl.
CPC ............ *B23K 3/0353* (2013.01); *B23K 3/0323* (2013.01); *B23K 3/0361* (2013.01); *B25G 3/22* (2013.01)

(58) Field of Classification Search
USPC ................................................ 219/238, 239
See application file for complete search history.

(56) References Cited

U.S. PATENT DOCUMENTS

| | | | |
|---|---|---|---|
| 2,371,534 A | 3/1945 | McGrath | |
| 2,973,422 A | 2/1961 | Smith | |
| 3,136,878 A | 6/1964 | Staller | |
| 3,264,449 A | 8/1966 | Brenner | |
| 3,383,857 A | 7/1968 | Taylor, Jr. | |
| 3,408,478 A * | 10/1968 | Dewey | 219/229 |
| 3,410,472 A * | 11/1968 | Weller et al. | 228/51 |
| 3,401,874 A | 8/1969 | Martinez | |
| 3,978,312 A | 8/1976 | Barton | |
| 4,014,343 A | 3/1977 | Esty | |
| 4,082,940 A | 4/1978 | Knowles | |
| 4,303,825 A | 12/1981 | Jaronen | |
| 4,359,052 A | 11/1982 | Staub | |
| 4,463,247 A | 7/1984 | Lawrence | |
| 4,563,570 A | 1/1986 | Johns | |
| 4,606,342 A | 8/1986 | Zamba | |
| 4,883,942 A | 11/1989 | Robak, Sr. | |
| 5,446,262 A | 8/1995 | McCambridge | |
| 2002/0109306 A1* | 8/2002 | Huggins et al. | 279/24 |
| 2005/0015080 A1 | 1/2005 | Ciccone | |
| 2014/0091075 A1 | 4/2014 | Liu | |

* cited by examiner

*Primary Examiner* — Joseph M Pelham
(74) *Attorney, Agent, or Firm* — Alan D. Kamrath; Kamrath IP Lawfirm, P.A.

(57) ABSTRACT

An electric heating tool includes a body to which a power supply member is mounted. A heating device includes a power receiving connector, a seat mounted to the power receiving connector, two connection legs, and a heating element. The power receiving connector is mounted to the power supply member and has two electrodes electrically connected to two electrodes of the power supply member. Each connection leg is received in one of two through-holes of the seat and includes a connection end and a heating end. The connection ends of the connection legs are electrically connected to the electrodes of the power receiving connector. The heating element is connected to the heating ends of the connection legs.

17 Claims, 6 Drawing Sheets

SIMPLE TYPE ELECTRIC HEATING TOOL AND HEATING DEVICE THEREOF

BACKGROUND OF THE INVENTION

The present invention relates to an electric heating tool and, more particularly, to a simple type electric heating tool and a heating device of the simple type electric heating tool.

A typical soldering iron includes a handle and a tip. After plugging in or mounting a battery into the handle to provide electrical connection with the tip, the tip generates heat by electric current passing therethrough, providing a high temperature for a soldering operation.

However, the tip is generally fixed to the handle, such that troublesome processing operations are required in manufacture of the soldering iron. Furthermore, a worker must fix the tip to the handle by a special technique, increasing the manufacturing costs of the soldering iron.

Furthermore, the tip is generally pointed. If a user intends to use a tip having a different shape, purchase of a soldering iron including a tip with a different shape is inevitable as well as inconvenient.

Thus, a need exists for a simple type electric heating tool and a heating device for the simple type electric heating tool to overcome the disadvantages of the conventional soldering irons.

BRIEF SUMMARY OF THE INVENTION

In a first aspect of the present invention, an electric heating tool is provided and includes a body having a holding portion and a connection portion spaced from the holding portion. The holding portion includes a handle adapted to be held by a user. The body further includes a power supply member mounted to the connection portion. The power supply member includes a first electrode and a second electrode. A heating device includes a power receiving connector, a seat, two connection legs, and a heating element. The power receiving connector includes a first electrode and a second electrode. The power receiving connector is detachably mounted to the power supply member. The first electrode of the power supply member is electrically connected to the first electrode of the power receiving connector. The second electrode of the power supply member is electrically connected to the second electrode of the power receiving connector. The seat is mounted to an end of the power receiving connector. The seat includes two through-holes. Each connection leg is inserted into one of the through-holes from an end of the seat distant to the power receiving connector. Each connection leg includes a connection end and a heating end. The connection end of one of the connection legs extends through one of the through-holes and is electrically connected to the first electrode of the power receiving connector. The connection end of the other connection leg extends through the other through-hole and is electrically connected to the second electrode of the power receiving connector. The heating element is connected to the heating ends of the connection legs.

In a second aspect of the present invention, a heating device for an electric heating tool is provided and includes a power receiving connector having a first electrode and a second electrode. A seat is mounted to an end of the power receiving connector and includes two through-holes. Two connection legs are provided. Each connection leg is inserted into one of the through-holes from an end of the seat distant to the power receiving connector. Each connection leg includes a connection end and a heating end. The connection end of one of the connection legs extends through one of the through-holes and is electrically connected to the first electrode of the power receiving connector. The connection end of the other connection leg extends through the other through-hole and is electrically connected to the second electrode of the power receiving connector. A heating element is connected to the heating ends of the connection legs.

In an embodiment, the seat can further include a narrow located in each through-hole. Each through-hole has a first width at the narrow. The first width is smaller than a second width of an end of each through-hole distant to the power receiving connector. The connection end of each connection leg has a width smaller than a width of the heating end of each connection leg. Each connection leg further includes a shoulder between the connection end and the heating end. The shoulders of the connection legs respectively abut the narrows in the through-holes.

In an embodiment, the through-holes are parallel to each other. Each through-hole has circular cross sections. Each connection leg is an integral member in a form of a hollow, circular tube formed by pressing.

In an embodiment, the power supply member is tubular. The first electrode of the power supply member is located at a bottom of the power supply member. The second electrode of the power supply member is located around the first electrode of the power supply member. The second electrode of the power supply member is an internally threaded part. The first electrode of the power receiving connector is located at a bottom of the power receiving connector. The second electrode of the power receiving connector is located around the first electrode of the power receiving connector. The second electrode of the power receiving connector is an externally threaded part. The power receiving connector is detachably and threadedly engaged with the power supply member.

In a first example, the heating element of the heating device is a wire and includes a pointed bend between two ends of the heating element.

In a second example, the heating element of the heating device is substantially a parallelepiped and includes a side facing away from the two connection legs. The side of the heating element has a flat or slide face.

In an embodiment, the power receiving connector, the connection legs, and the heating element of the heating device are made of electrically conductive material, and the seat is made of electrically insulating material.

In an embodiment, a chuck is mounted to the connection portion of the body. The chuck includes an end rotatably received in a receiving space of the handle. The power supply member is mounted to the other end of the chuck distant to the holding portion.

In an embodiment, the handle further includes a ledge on an inner periphery delimiting the receiving space. A gap is defined between two ends of the ledge. The handle further includes a stop protruding into the receiving space and adjoining the gap. The chuck includes a protrusion passable through the gap. The protrusion slideably abuts a side of the ledge to permit the chuck to rotate relative to the handle. The protrusion selectively abuts the stop. Thus, the stop prevents the chuck from disengaging from the handle.

In an embodiment, the handle further includes a slot adjoining the gap. A block is mounted to the handle and includes an inner side on which the stop is formed. The stop extends from an outer side of the handle through the slot into the receiving space.

In an embodiment, the handle is a hollow, circular tube.

In an embodiment, an anti-slip sleeve is mounted around the handle and abuts an outer side of the block. The handle further includes a control button adapted to be operated by the user to form a closed loop enabling the heating element to generate heat. An end cap is removably mounted to the other end of the handle distant to the connection portion. The end cap closes the other end of the handle. The receiving space of the handle is adapted to receive a battery. The first and second electrodes of the power supply member are adapted to be electrically connected to a positive pole and a negative pole of the battery.

Other objectives, advantages, and novel features of the present invention will become clearer in light of the following detailed description described in connection with the accompanying drawings.

DETAILED DESCRIPTION OF THE INVENTION

Figure 1:
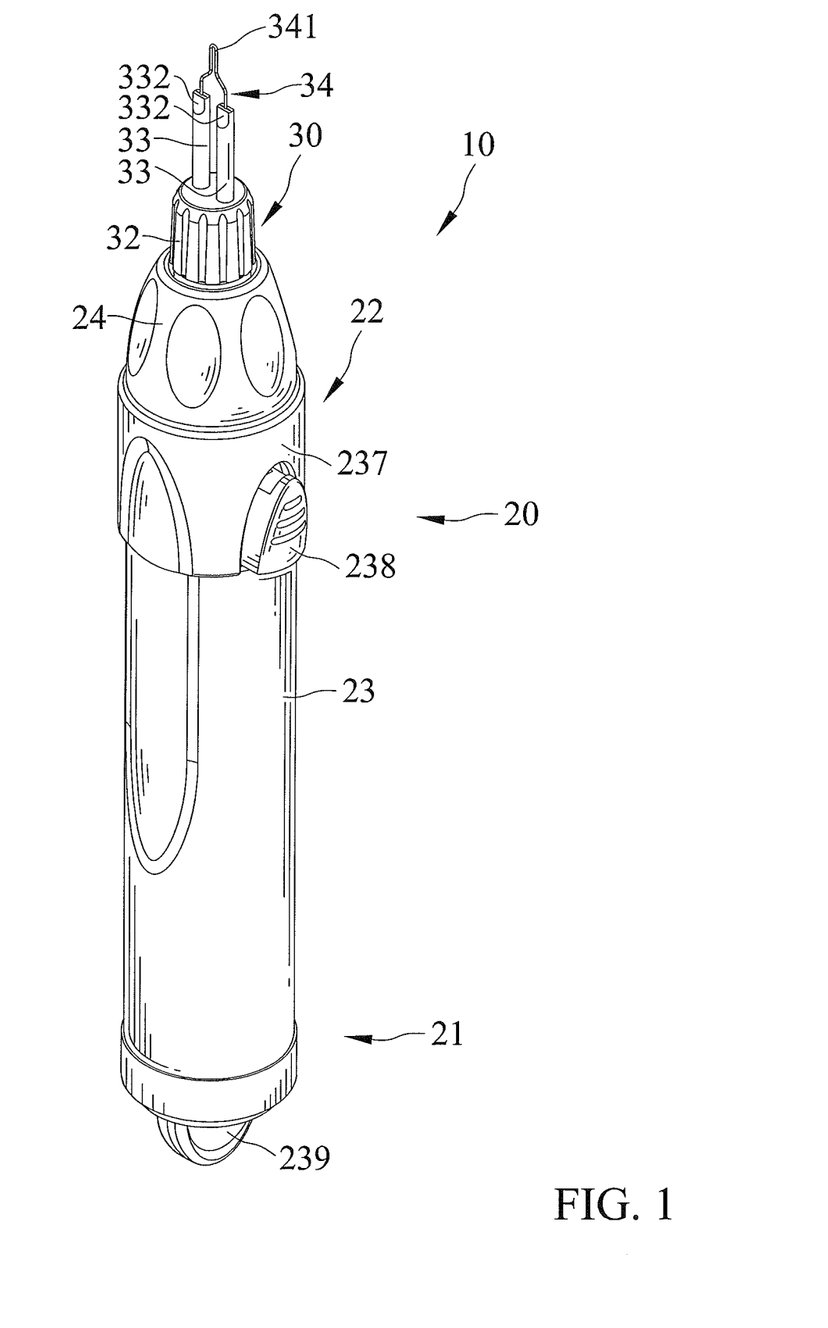
FIG. 1 is a perspective view of an electric heating tool according to the present invention, with the electric heating tool including a first example of a heating device.
Figure 2:
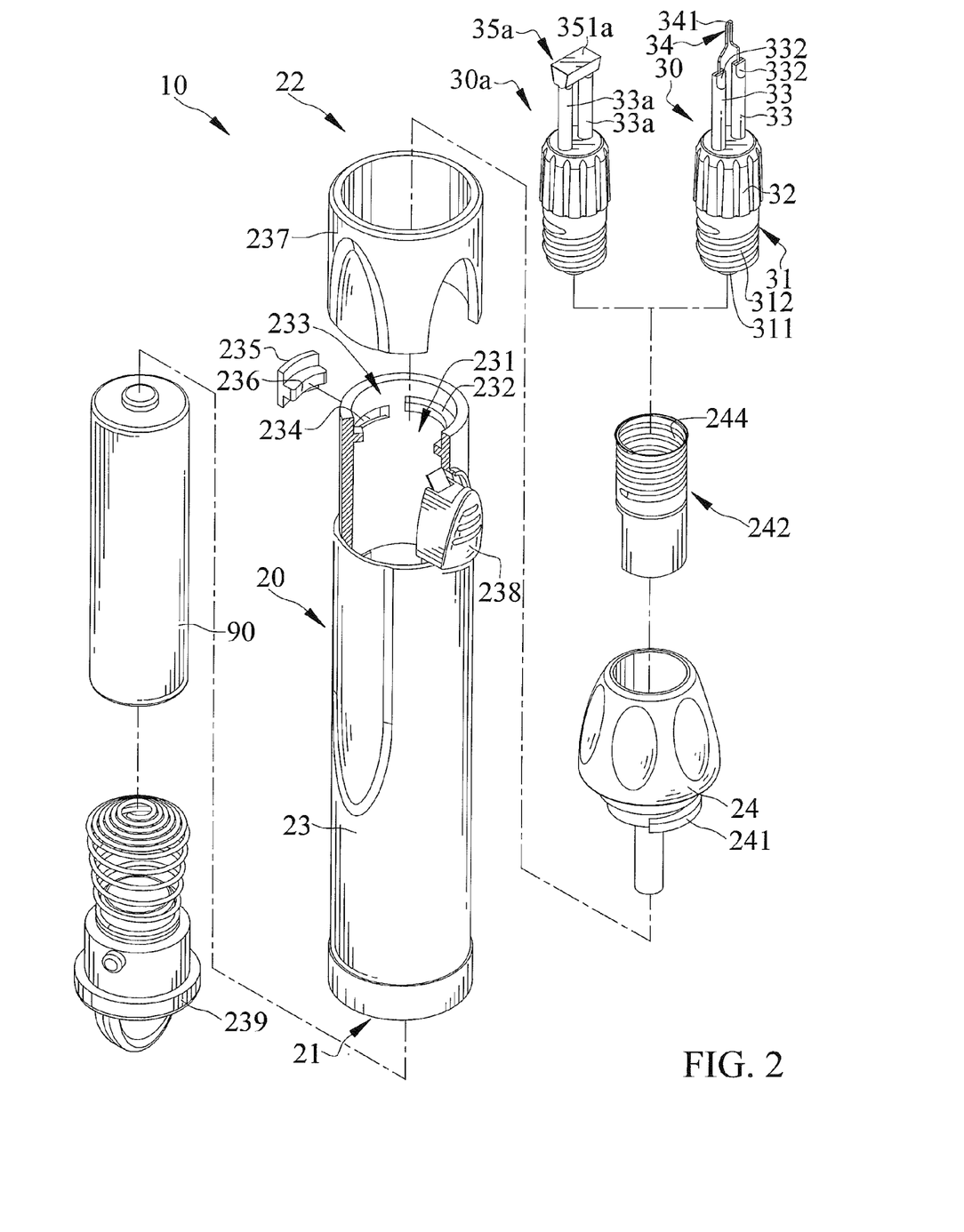
FIG. 2 is an exploded, perspective view of the electric heating tool according to the present invention, with the first example of the heating device and a second example of the heating device selectively used.
Figure 3:
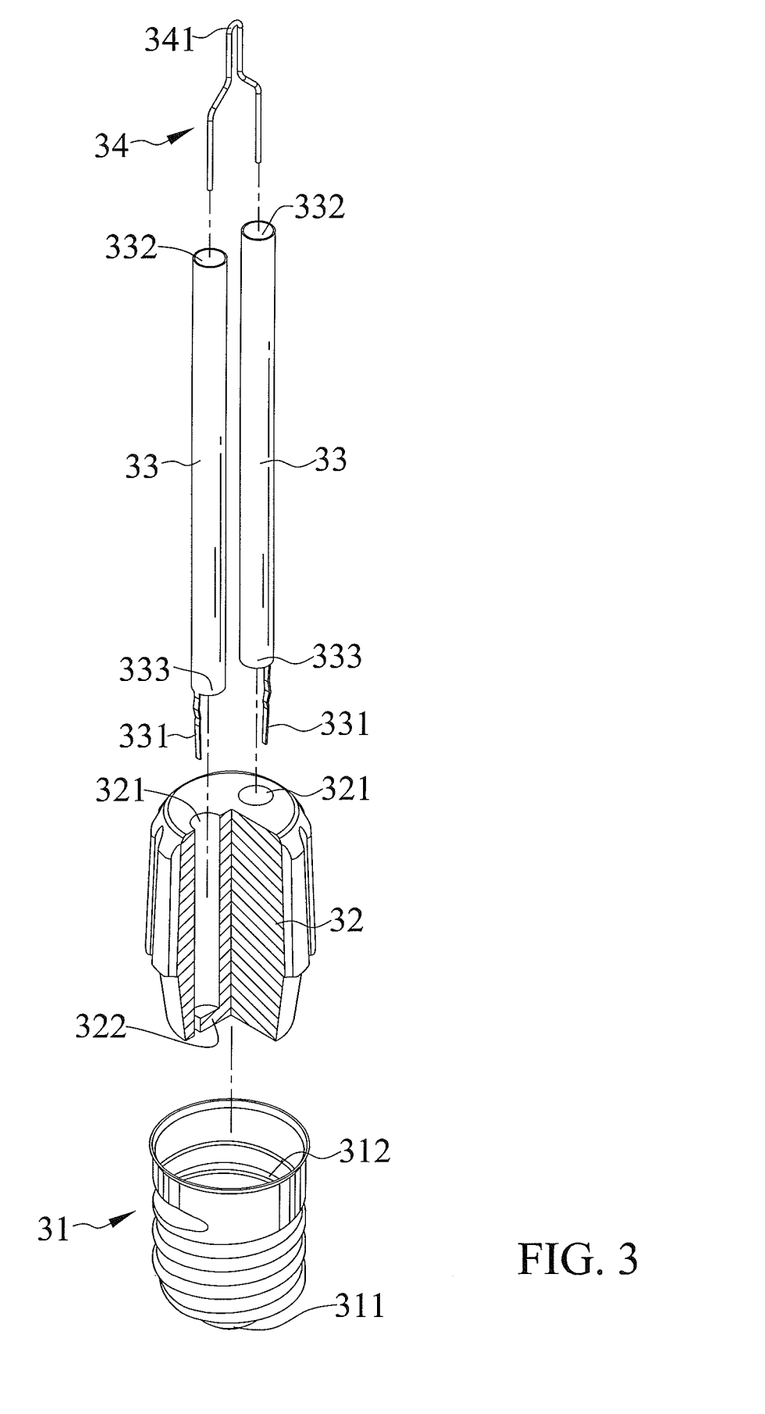
FIG. 3 is an exploded, perspective view of the first example of the heating device.
Figure 4:
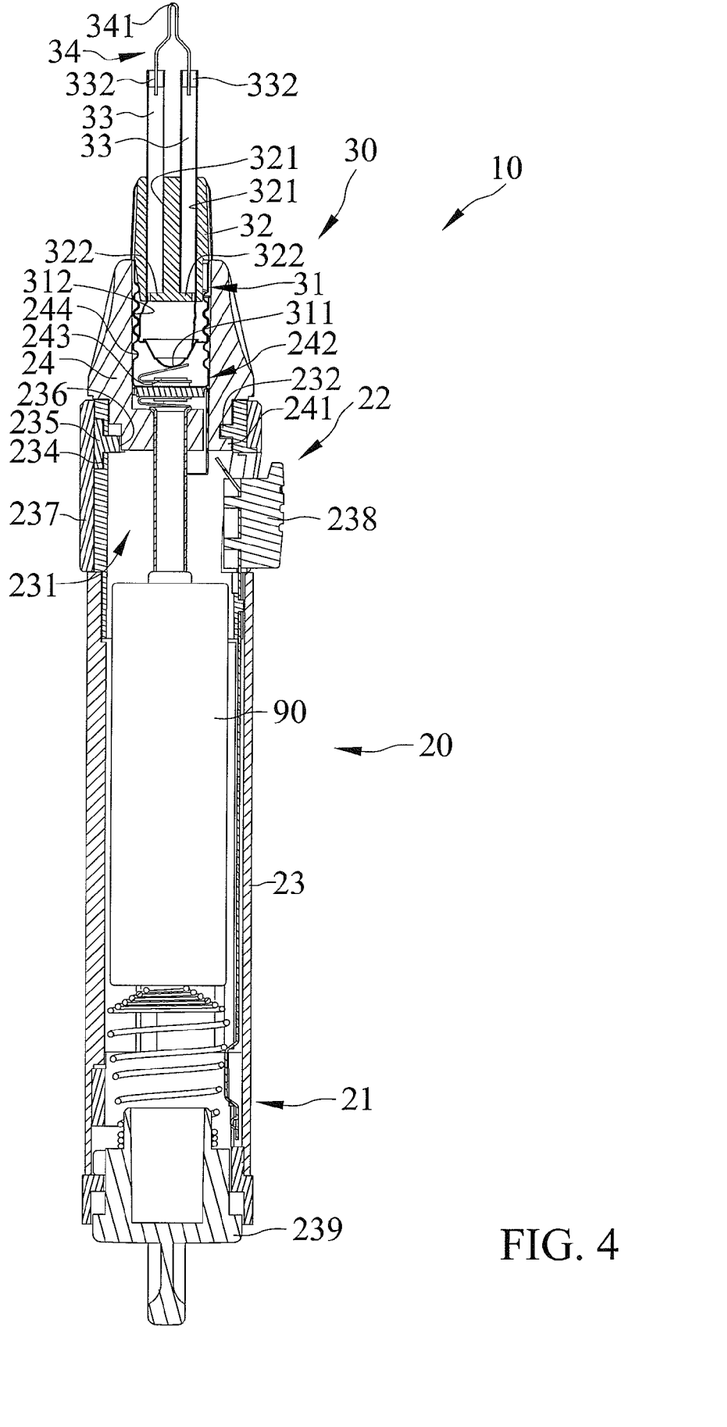
FIG. 4 is a cross sectional view of the electric heating tool including the first example of the heating device.
Figure 5:
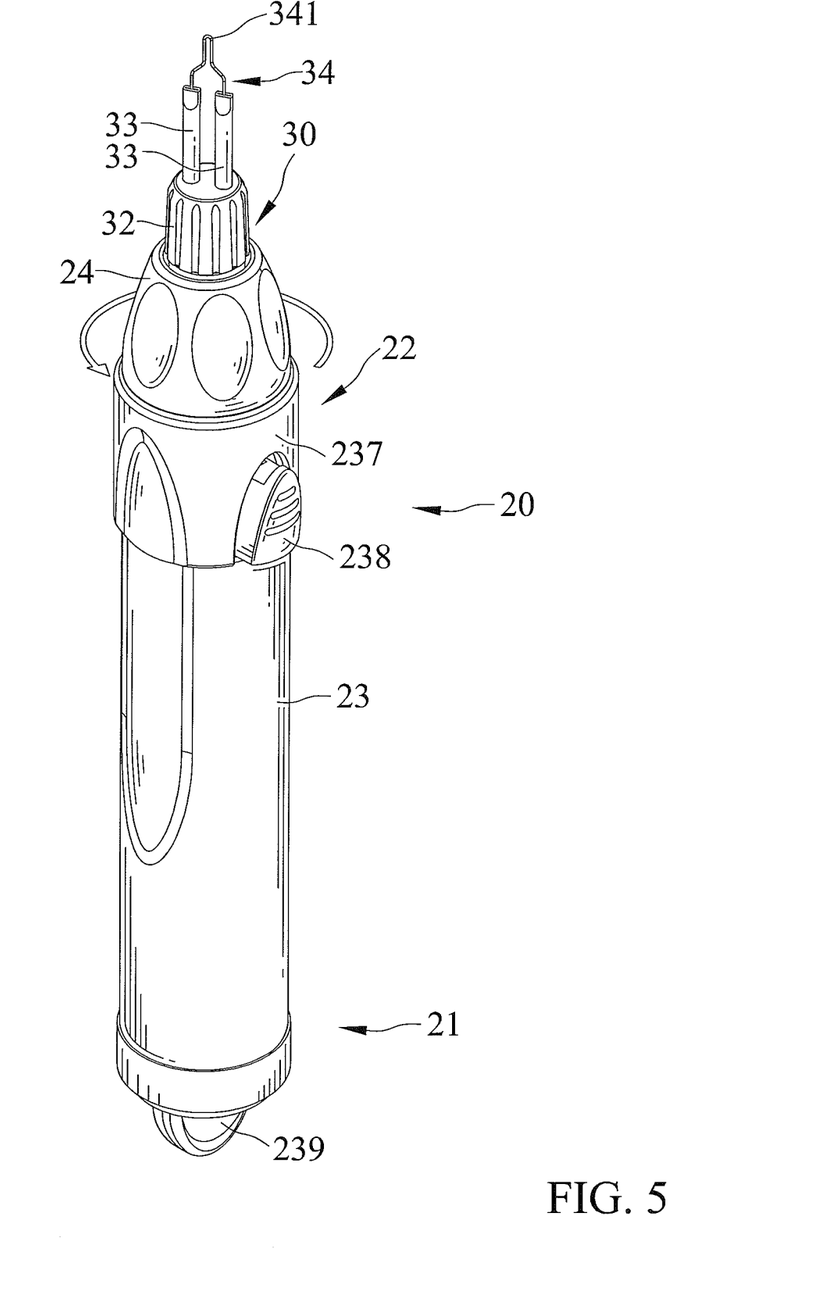
FIG. 5 is a perspective view of the electric heating tool including the first example of the heating device, with a chuck of the electric heating tool rotated.
Figure 6:
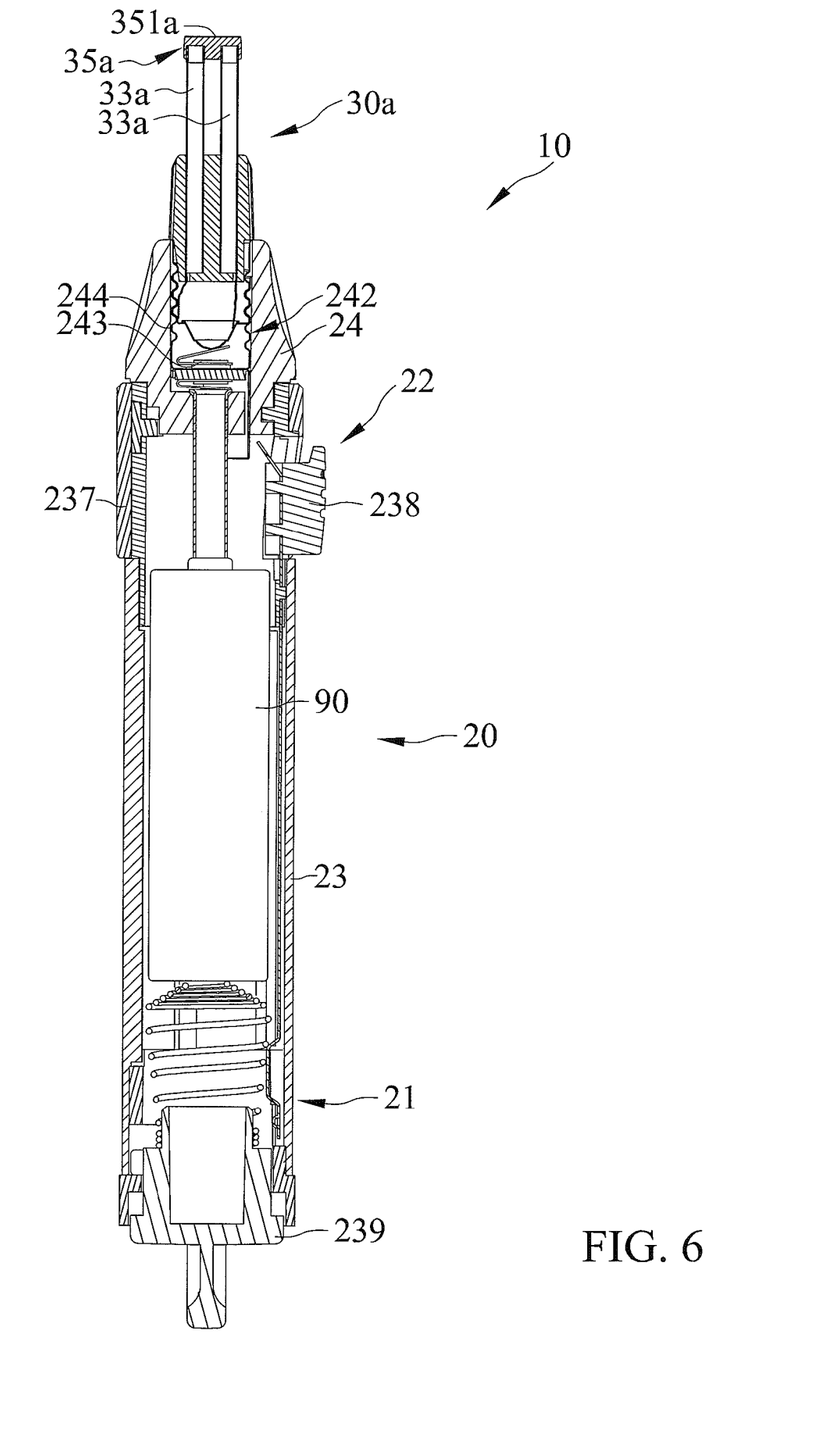
FIG. 6 is a cross sectional view of the electric heating tool including the second example of the heating device.

With reference to FIGS. 1-6, an electric heating tool 10 according to the present invention includes a body 20 and a heating device 30, 30a. A first example of the heating device 30 is shown in FIGS. 1-5. A second example of the heating device 30a is shown in FIGS. 2 and 6.

With reference to FIGS. 1-6, the body 20 includes a holding portion 21 and a connection portion 22 spaced from the holding portion 21. The holding portion 21 includes a handle 23 adapted to be held by a user. The handle 23 is in the form of a hollow, circular tube and includes a receiving space 231. The receiving space 231 of the handle 23 is adapted to receive a battery 90. A ledge 232 is formed on an inner periphery delimiting the receiving space 231. A gap 233 is defined between two ends of the ledge 232. The handle 23 further includes a slot 234 adjoining the gap 233. A block 235 is mounted to the handle 23 and includes a stop 236 on an inner side thereof. The stop 236 extends from an outer side of the handle 23 through the slot 234 into the receiving space 231 and adjoins the gap 233.

An anti-slip sleeve 237 is mounted around the handle 23. The anti-slip sleeve 237 abuts an outer side of the block 235. The handle 23 further includes a control button 238 adapted to be operated by the user to form a closed loop enabling the heating element 34, 35a to generate heat. An end cap 239 is removably mounted to the other end of the handle 23 distant to the connection portion 22. The end cap 239 closes the other end of the handle 23.

A chuck 24 is mounted to the connection portion 22 of the body 20. An end of the chuck 24 is rotatably received in the receiving space 231 of the handle 23. The chuck 24 includes a protrusion 241 passable through the gap 233. The protrusion 241 slideably abuts a side of the ledge 232 to permit the chuck 24 to rotate relative to the handle 23. Furthermore, the protrusion 241 selectively abuts the stop 236, such that the stop 236 prevents the chuck 24 from disengaging from the handle 23.

A power supply member 242 is mounted to the other end of the chuck 24 distant to the holding portion 21. The power supply member 242 is tubular and includes a first electrode 243 and a second electrode 244. The first electrode 243 of the power supply member 242 is located at a bottom of the power supply member 242. The second electrode 244 of the power supply member 242 is located around the first electrode 243 of the power supply member 242 and is in the form of an internally threaded part. The first and second electrodes 243 and 244 of the power supply member 242 are adapted to be electrically connected to a positive pole and a negative pole of the battery 90.

In both of the first and second examples, the heating device 30, 30a includes a power receiving connector 31, a seat 32, two connection legs 33, 33a, and a heating element 34, 35a. The power receiving connector 31 includes a first electrode 311 and a second electrode 312. The first electrode 311 of the power receiving connector 31 is located at a bottom of the power receiving connector 31. The second electrode 312 of the power receiving connector 31 is located around the first electrode 311 of the power receiving connector 31. The second electrode 312 of the power receiving connector 31 is in the form of an externally threaded part. The power receiving connector 31 is detachably and threadedly engaged with the power supply member 242, with the first electrode 243 of the power supply member 242 electrically connected to the first electrode 311 of the power receiving connector 31, and with the second electrode 244 of the power supply member 242 electrically connected to the second electrode 312 of the power receiving connector 31.

The seat 32 is mounted to an end of the power receiving connector 31 distant to the power supply member 242. The seat 32 includes two through-holes 321. The through-holes 321 are parallel to each other. Each through-hole 321 has circular cross sections. Furthermore, the seat 32 further includes a narrow 322 located in each through-hole 321 and located adjacent to an end of each through-hole 321 adjacent to the power receiving connector 31. Each through-hole 321 has a first width at the narrow 322. The first width is smaller than a second width of an end of each through-hole 321 distant to the power receiving connector 31.

Each connection leg 33, 33a is inserted into one of the through-holes 321 from an end of the seat 32 distant to the power receiving connector 31. Each connection leg 33, 33a includes a connection end 331 and a heating end 332. The connection end 331 of each connection leg 33, 33a has a width smaller than a width of the heating end 332 of each connection leg 33, 33a. The connection end 331 of one of the connection legs 33, 33a extends through one of the through-holes 321 and is electrically connected to the first electrode 311 of the power receiving connector 31. The connection end 331 of the other connection leg 33, 33a extends through the other through-hole 321 and is electrically connected to the second electrode 312 of the power receiving connector 31. Each connection leg 33, 33a further includes a shoulder 333 between the connection end 331 and the heating end 332. The shoulders 333 of the connection legs 33, 33a respectively abut the narrows 322 in the through-holes 321. Each connection leg 33, 33a is an integral member in the form of a hollow, circular tube formed by pressing.

The heating element 34, 35a is connected to the heating ends 332 of the connection legs 33, 33a. In the first example, the heating element 34 of the heating device 30 is a wire and includes a pointed bend 341 between two ends of the heating element 34. In the second example, the heating element 35a of the heating device 30a is substantially a parallelepiped and includes a side facing away from the connection legs 33a. The side of the heating element 35a has a flat or slide face 351a. It can be appreciated that other types of heating elements 30, 30a can be used according to different situations to allow easy soldering operation. The power receiving connector 31, the connection legs 33, 33a, and the heating element 34, 35a of the heating device 30, 30a is made of electrically conductive material, and the seat 32 is made of electrically insulating material.

In use, the battery 90 is mounted into the body 20 with the positive and negative poles of the battery 90 electrically and respectively connected to the first and second electrodes 243 and 244 of the power supply member 242. When the control button 238 is moved to an operative position, the heating element 34, 35a generates heat to proceed with soldering.

The heating device 30, 30a is simple in structure such that the heating device 30, 30a can easily be processed and assembled to effectively reduce the manufacturing costs of the electric heating tool 10. Furthermore, the connection legs 33, 33a are formed by pressing to reduce the difficulties in processing and the manufacturing costs. Furthermore, the heating device 30, 30a is coupled to the body 20 by threading coupling, allowing the user to rapidly replace the heating device 30, 30a. Furthermore, since the chuck 24 can rotate relative to the handle 23, the chuck 24 can be used to adjust the heating device 30, 30a to an appropriate angular position after assembly of the heating device 30, 30a.

Although preferred embodiments of the present invention have been illustrated and described, they should not be construed to restrict the scope of the present invention. Therefore, modifications to numerical values or substitution of equivalent elements thereof or equivalent changes and modifications based on the accompanying claims of the present invention still fall within the scope covered by the present invention.

The invention claimed is:

1. A electric heating tool comprising:
   a body including a holding portion and a connection portion spaced from the holding portion, with the holding portion including a handle adapted to be held by a user, with the body further including a power supply member mounted to the connection portion, and with the power supply member including a first electrode and a second electrode; and
   a heating device including a power receiving connector, a seat, two connection legs, and a heating element, with the power receiving connector including a first electrode and a second electrode, with the power receiving connector detachably mounted to the power supply member, with the first electrode of the power supply member electrically connected to the first electrode of the power receiving connector, with the second electrode of the power supply member electrically connected to the second electrode of the power receiving connector, with the seat mounted to an end of the power receiving connector, with the seat including two through-holes, with each of the two connection legs inserted into one of the two through-holes from an end of the seat distant to the power receiving connector, with the seat further including a narrow located in each of the two through-holes, with each of the two through-holes having a first width at the narrow, with the first width smaller than a second width of each of the two through-holes distant to the power receiving connector, with each of the two connection legs including a connection end and a heating end, with the connection end of one of the two connection legs extending through one of the two through-holes and electrically connected to the first electrode of the power receiving connector, with the connection end of another of the two connection legs extending through another of the two through-holes and electrically connected to the second electrode of the power receiving connector, with the connection end of each of the two connection legs having a width smaller than a width of the heating end of each of the two connection legs, with each of the two connection legs further including a shoulder between the connection end and the heating end, and with the shoulders of the two connection legs respectively abutting the narrows in the two through-holes, and with the heating element connected to the heating ends of the two connection legs.

2. The electric heating tool according to claim 1, with the two through-holes parallel to each other, with each of the two through-holes having circular cross sections, and with each of the two connection legs being an integral member in a form of a hollow, circular tube formed by pressing.

3. The electric heating tool according to claim 1, with the power supply member being tubular, with the first electrode of the power supply member located at a bottom of the power supply member, with the second electrode of the power supply member located around the first electrode of the power supply member, with the second electrode of the power supply member being an internally threaded part, with the first electrode of the power receiving connector located at a bottom of the power receiving connector, with the second electrode of the power receiving connector located around the first electrode of the power receiving connector, with the second electrode of the power receiving connector being an externally threaded part, and with the power receiving connector detachably and threadedly engaged with the power supply member.

4. The electric heating tool according to claim 3, with the heating element of the heating device being a wire and including a pointed bend between two ends of the heating element.

5. The electric heating tool according to claim 3, with the heating element of the heating device being substantially a parallelepiped and including a side facing away from the two connection legs, and with the side of the heating element having a flat face.

6. The electric heating tool according to claim 1, with the power receiving connector, the two connection legs, and the heating element of the heating device being made of electrically conductive material, and with the seat being made of electrically insulating material.

7. The electric heating tool according to claim 1, further comprising: a chuck mounted to the connection portion of the body, with the chuck including an end rotatably received in a receiving space of the handle, and with the power connecting member mounted to another end of the chuck distant to the holding portion.

8. An electric heating tool comprising:
   a body including a holding portion and a connection portion spaced from the holding portion, with the holding portion including a handle adapted to be held by a user, with the body further including a power supply member mounted to the connection portion, and with the power supply member including a first electrode and a second electrode;
   a heating device including a power receiving connector, a seat, two connection legs, and a heating element, with the power receiving connector including a first electrode and a second electrode, with the power receiving connector detachably mounted to the power supply member, with the first electrode of the power supply member electrically connected to the first electrode of the power receiving connector, with the second electrode of the power supply member electrically connected to the second electrode of the power receiving connector, with the seat mounted to an end of the power receiving connector, with the seat including two through-holes, with each of the two connection legs inserted into one of the two through-holes from an end of the seat distant to the power receiving connector, with each of the two connection legs including a connection end and a heating end, with the connection end of one of the two connection legs extending through one of the two through-holes and electrically connected to the first electrode of the power receiving connector, with the connection end of another of the two connection legs extending through another of the two through-holes and electrically connected to the second electrode of the power receiving connector, and with the heating element connected to the heating ends of the two connection legs; and a chuck mounted to the connection portion of the body, with the chuck including an end rotatably received in a receiving space of the handle, and with the power supply member mounted to another end of the chuck distant to the holding portion, with the handle further including a ledge on an inner periphery delimiting the receiving space, with the ledge having two ends, with a gap defined between the two ends of the ledge, with the handle further including a stop protruding into the receiving space and adjoining the gap, with the chuck including a protrusion, with the protrusion passable through the gap, with the protrusion slideably abutting a side of the ledge to permit the chuck to rotate relative to the handle, with the protrusion selectively abutting the stop, and with the stop preventing the chuck from disengaging from the handle.

9. The electric heating tool according to claim 8, with the handle further including a slot adjoining the gap, with a block mounted to the handle and including an inner side on which the stop is formed, with the stop extending from an outer side of the handle through the slot into the receiving space.

10. The electric heating tool according to claim 8, with the handle being a hollow, circular tube.

11. The electric heating tool according to claim 9, further comprising:

an anti-slip sleeve mounted around the handle, with the anti-slip sleeve abutting an outer side of the block, and with the handle further including a control button adapted to be operated by the user to form a closed loop enabling the heating element to generate heat; and an end cap removably mounted to another end of the handle distant to the connection portion, with the end cap closing the other end of the handle, with the receiving space of the handle adapted to receive a battery, and with the first and second electrodes of the power supply member adapted to be electrically connected to a positive pole and a negative pole of the battery.

12. A heating device for an electric heating tool comprising:

a power receiving connector including a first electrode and a second electrode;

a seat mounted to an end of the power receiving connector, with the seat including two through-holes, with the seat further including a narrow located in each of the two through-holes, with each of the two through-holes having a first width at the narrow, with the first width smaller than a second width of an end of each of the two through-holes distant to the power connector;

two connection legs, with each of the two connection legs inserted into one of the two through-holes from an end of the seat distant to the power receiving connector, with each of the two connection legs including a connection end and a heating end, with the connection end of one of the two connection legs extending through one of the two through-holes and electrically connected to the first electrode of the power receiving connector, with the connection end of another of the two connection legs extending through another of the two through-holes and electrically connected to the second electrode of the power receiving connector, with the connection end of each of the two connection legs having a width smaller than a width of the heating end of each of the two connection legs, with each of the two connection legs further including a shoulder between the connection end and the heating end, and with the shoulders of the two connection legs respectively abutting the narrows in the two through-holes;

a heating element connected to the heating ends of the two connection legs.

13. The heating device for an electric heating tool according to claim 12, with the first electrode of the power receiving connector located at a bottom of the power receiving connector, with the second electrode of the power receiving connector located around the first electrode of the power receiving connector, with the second electrode of the power receiving connector being an externally threaded part.

14. The heating device for an electric heating tool according to claim 13, with the heating element of the heating device being a wire and including a pointed bend between two ends of the heating element.

15. The heating device for an electric heating tool according to claim 12, with the heating element of the heating device being substantially a parallelepiped and including a side facing away from the two connection legs, and with the side of the heating element having a flat face.

16. The heating device for an electric heating tool according to claim 12, with the power receiving connector, the two connection legs, and the heating element of the heating device being made of electrically conductive material, and with the seat being made of electrically insulating material.

17. A heating device for an electric heating tool comprising:

a power receiving connector including a first electrode and a second electrode;

a seat mounted to an end of the power receiving connector, with the seat including two through-holes, with the two through-holes parallel to each other, with each of the two through-holes having circular cross sections;

two connection legs, with each of the two connection legs inserted into one of the two through-holes from an end of the seat distant to the power receiving connector, with each of the two connection legs including a connection end and a heating end, with the connection end of one of the two connection legs extending through one of the two through-holes and electrically connected to the first electrode of the power receiving connector, with the connection end of another of the two connection legs extending through another of the two through-holes and electrically connected to the second electrode of the power receiving connector, and with each of the two connection legs being an integral member in a form of a hollow, circular tube formed by pressing;

a heating element connected to the heating ends of the two connection legs.

* * * * *